L. W. CHUBB.
PROCESS AND APPARATUS FOR ELECTRIC WELDING.
APPLICATION FILED FEB. 16, 1912.
1,066,468.
Patented July 8, 1913.
3 SHEETS—SHEET 1.
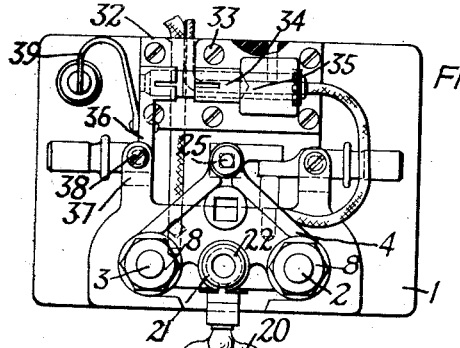
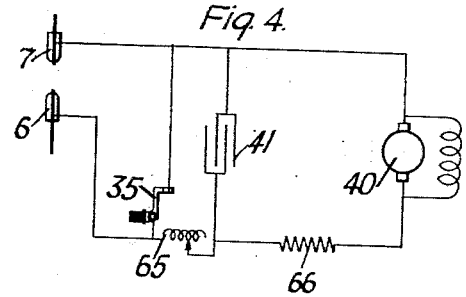
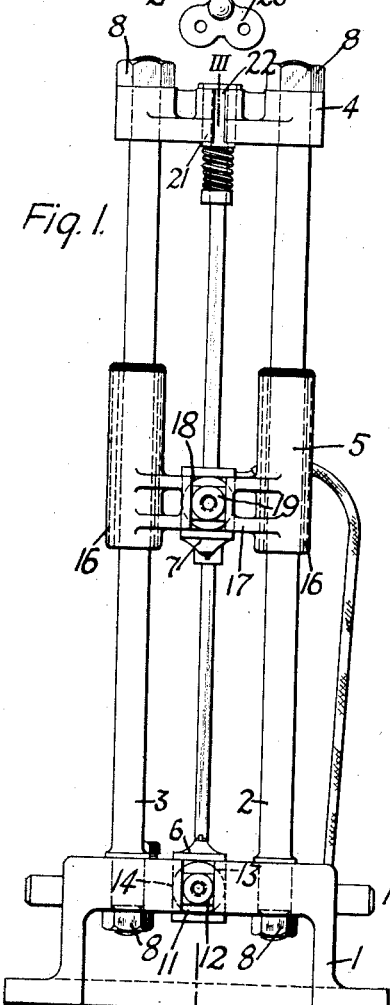
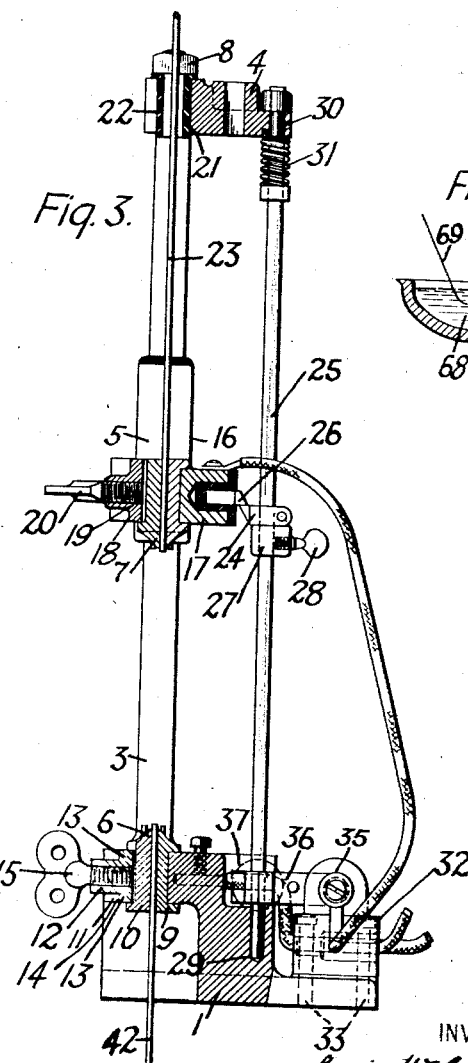
INVENTOR
Lewis W. Chubb
BY
ATTORNEY L. W. CHUBB.
PROCESS AND APPARATUS FOR ELECTRIC WELDING.
APPLICATION FILED FEB. 16, 1912.
1,066,468.
Patented July 8, 1913.
3 SHEETS—SHEET 2.
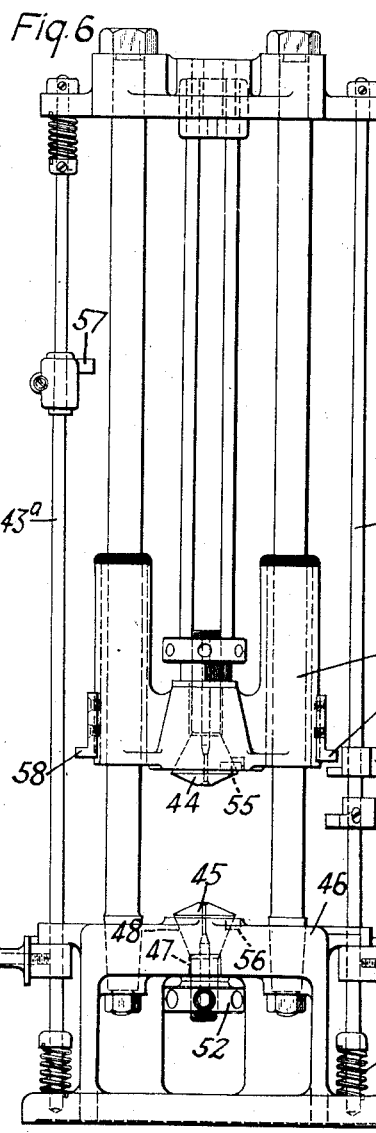
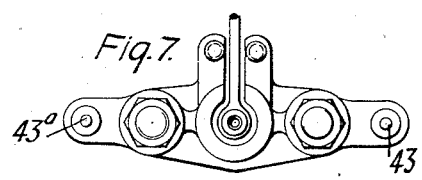
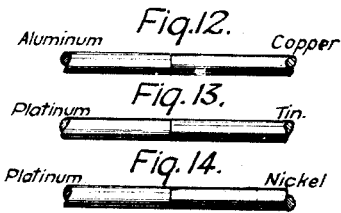
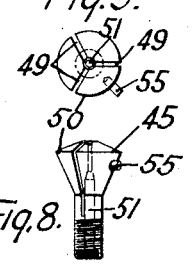
WITNESSES:
INVENTOR
Lewis W. Chubb
BY
ATTORNEY

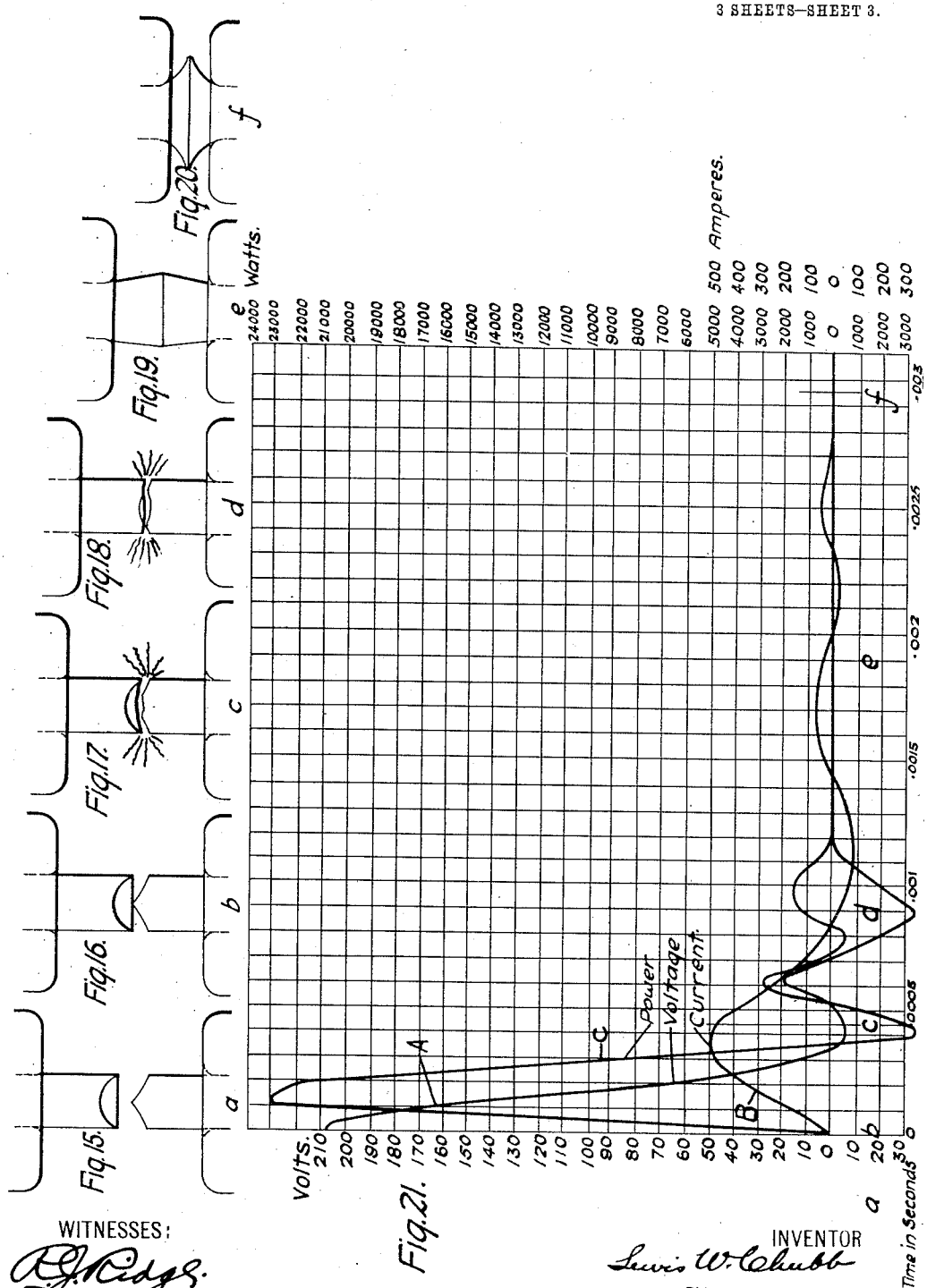

UNITED STATES PATENT OFFICE.

LEWIS W. CHUBB, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

PROCESS AND APPARATUS FOR ELECTRIC WELDING.

1,066,468.  Specification of Letters Patent. Patented July 8, 1913.

Application filed February 16, 1912. Serial No. 678,108.

*To all whom it may concern:*

Be it known that I, LEWIS W. CHUBB, a citizen of the United States, and a resident of Edgewood Park, in the county of Allegheny and State of Pennsylvania, have invented a new and useful Improvement in Processes and Apparatus for Electric Welding, of which the following is a specification.

My invention relates to the art of joining like and unlike metal members, and it has special reference to apparatus for and methods of electric welding.

One object of my invention is to provide a particularly simple and inexpensive process or method of expeditiously and effectively welding together bodies of either like or unlike metals having such characteristics or dimensions, or both, as have precluded successful results by the use of methods heretofore known and practised.

Another object of my invention is to provide simple and durable apparatus that shall be specially adapted for producing ductile and homogeneous welded joints between like and unlike metal bodies Copper and iron wire, rods and bars have been successfully welded for many years by forcing or clamping the conductors into engagement with each other and passing electric current through the junction until the necessary heat has been generated for fusing the members together. Great difficulty has, however, been experienced in welding aluminum conductors by the usual methods, and it has heretofore been considered practically impossible to obtain a ductile joint between unlike metals, such, for example, as aluminum and copper which tend to form a very brittle alloy with each other when united in certain proportions. It has also been considered practically impossible to weld two metals, such as tin and platinum, having two very widely different melting points.

I believe that the difficulty heretofore experienced in welding aluminum bodies was mainly due to the fact that their surfaces oxidized with extreme rapidity, and, consequently, although the surfaces to be welded were carefully cleaned, they became recoated with a thin oxid film before it was possible to weld them.

Ordinary methods of welding, by the use of electric current or otherwise, are obviously unadapted for uniting such metals as tin and platinum, or other unlike metals which melt at widely different temperatures, since the metal having the lower melting point is invariably overheated or becomes a liquid before the other metal even approaches a welding temperature. Ordinary methods are also ineffective for producing satisfactory welds between copper and aluminum or other metals which tend to form brittle alloys, it having been found that, for a considerable distance on each side of the junction point, alloys of the two metals are produced, the proportions varying from the junction outward until points are reached where each metal is free from the other. It is therefore evident that, if the two metals produce a brittle alloy when united in any proportions, there will be at least one section on each side of the joint where the brittle alloy appears and where the welded structure is very liable to break.

According to my present invention, I overcome the difficulties heretofore encountered by concentrating relatively large quantities of both electrical and mechanical energy at the point of engagement between the members to be welded for an almost inappreciable length of time.

The specific method which I have found most effective and desirable consists in connecting the conducting bodies which are to be welded to the terminals of a condenser which has been suitably charged with electrical energy and then bringing them into percussive engagement simultaneously with an explosive condenser discharge between them.

On account of the great heat intensity that can be concentrated at the desired point for a very short period of time by a condenser discharge, the welding heat thus produced is particularly effective, but the locally applied heat which is utilized in conjunction with percussive engagement of the bodies to be welded may be otherwise produced if of sufficient intensity and applied in a proper manner.

The effect of the concentration of energy above referred to on aluminum conductors is to vaporize a very small quantity of the aluminum on the engaging surfaces, thereby blowing out laterally in all directions the vaporized material and carrying off, or at least breaking up, the oxid film which has hitherto prevented the welding of aluminum successfully.

In welding unlike metals which produce, when united in ordinary ways, a brittle alloy, the energy and heat are so concentrated and are continued for such a very short interval of time that there is no appreciable flowing of one metal into the other, the line of demarcation being very sharp, even when the united bodies are rolled out into a very thin plate or foil, and the joint is viewed through a microscope. If a film of brittle alloy is produced at the joint, the film is so thin that it is flexible. This is true of various combinations of metals, such as tin and aluminum, copper and platinum, lead and tin, tin and platinum, tin and copper and nickel and platinum, but perhaps the most remarkable instance is the uniting of copper and aluminum, since these metals, when united by such methods as have heretofore been known produce joints which are as brittle as glass.

In the accompanying drawings, Figure 1 is a front elevation, Fig. 2 a plan view, and Fig. 3 a sectional elevation on the line III—III of Fig. 1, of a welding machine constructed in accordance with, and adapted for use in practising, my invention. Fig. 4 is a simple diagram illustrating the circuit connections for the machine shown in Figs. 1, 2 and 3, and Fig. 5 is a sectional, detail view of a means for practising a supplemental step of my process. Figs. 6 and 7 correspond, respectively, to Figs. 1 and 2, and illustrate a slightly modified welding machine structure which is particularly adapted for producing leads for mercury vapor rectifiers and other similar devices in which conducting wires are sealed into glass bulbs from which the air is exhausted. Figs. 8 and 9 are, respectively, an elevation and a plan view of one of the clamping chucks with which the machine of Fig. 6 is provided. Fig. 10 is a sectional elevation, and Fig. 11 a plan view of a modified clamping chuck adapted to receive small screws which are to be provided with platinum tips. Figs. 12, 13 and 14 illustrate welded joints which form parts of my invention, and are produced by my welding process. Figs. 15 to 20, inclusive, are diagrammatic views, on a relatively large scale, of the terminals of a pair of conducting wires or rods at the successive stages in the welding process. Fig. 21 illustrates, by a set of curves, the condition of the voltage, the current and the power in the welding circuit.

Referring to Figs. 1, 2 and 3 of the drawings, the machine here shown comprises a base 1, substantially parallel uprights 2 and 3, a stationary head 4, a movable head or carriage 5 which slides on the uprights 2 and 3, and a pair of similar clamping chucks 6 and 7.

The uprights 2 and 3 may be of any suitable form, and, not only constitute guideways for the movable head or carriage 5, but also constitute parts of the frame or structure of the machine in conjunction with the members 1 and 4. As shown in the drawing, the uprights are cylindrical and extend through suitable holes in the members 1 and 4, being screw-threaded at their ends to receive clamping nuts 8.

The clamping chuck 6 has the general form of a spool or flanged cylinder, and is split longitudinally into two parts 9 and 10 which are correspondingly grooved to receive one of the conducting rods or wires which are to be welded in the machine. The chuck is mounted in a slot 11 in base 1, between the uprights 2 and 3, and is held in position and caused to grip a wire or rod by means of a nut 12 having shoulders 13 which fit into side grooves 14 in the slot 11, and a clamping screw 15 which is screwed through the nut and engages the part 10 of the chuck.

The carriage 5 comprises a pair of sleeves 16 which slide on the uprights 2 and 3 and a web 17 which is provided with a slot 18 corresponding to the slot 11 in the base 1. The chuck 7 is similar to the chuck 6, and is similarly supported in the slot 18 by means of coöperating clamping nut 19 and screw 20.

The stationary head 4 is provided with a hole 21, having a guide bushing 22 through which a conducting wire 23 may be threaded, if desired. It is usually found more convenient, however, unless the wire is very large and stiff, to bring it into the top of the chuck 7 without passing through the bushing 22.

In order to support the carriage 5 in a raised position, a catch 24 is mounted on a vertical rod 25 which is substantially parallel to the uprights 2 and 3, and coöperates with a projection 26 on the web 17 of the carriage 5. The catch 24 may be set at any suitable, or desired position on the rod 25 by means of a collar 27, on which the latch 24 rests, the collar being provided with a set screw 28. The rod 25 is rotatively supported in bearings 29 and 30 in the parts 1 and 4, and is provided with a spring 31 which tends to turn it to such position that the parts 24 and 26 are in alinement with each other. Both the catch 24 and the projection 26 are beveled so that the carriage may be raised without hindrance from the catch, but may not be lowered until the catch is released by a slight rotative movement of the rod 25, as will be hereinafter pointed out.

An insulating block 32 is secured to the base 1 by bolts 33, and supports a stationary contact member 34, of a hand-operated switch 35. The switch 35 also comprises a coöperating movable contact member 36 which is pivotally secured to a projection 37 of the base by means of a pin 38. The coöperating contact members are normally held in engagement with each other by means of a spring 39 which operates directly on the movable member 36.

Referring to Fig. 4, energy is supplied, from any suitable source, such as a generator 40, to a condenser 41, the terminals of which are connected to the chucks 6 and 7, that constitute the terminals of the welding machine. The switch 35 normally completes a short circuit across the welding terminals so that an attendant may safely clamp the conducting wires in the chucks, and otherwise make the necessary preparations for producing a welded joint.

The operation of the machine is as follows: a conducting wire 42 is so secured in the chuck 6 as to project upwardly for a short distance therefrom. Another conductor 23 is so secured in the chuck 7 as to project slightly below it, and carriage 5 is raised to a desired height that is determined by the setting of the latch 24. The latch setting depends upon the size of wires to be welded and the materials of which they are composed. The switch 35 may then be opened by the attendant to permit the generator 40 to charge the condenser 41. The catch 24 may then be withdrawn from the projection 26 to permit the carriage 5 to drop and carry the end of the conducting wire 23 into percussive engagement with the end of the wire 42. At the instant of contact, the condenser 41 is discharged and the energy thus concentrated at the point of contact is sufficiently great to produce a perfect weld between the wires.

The process is the same for welding wires of like and unlike materials, and, in fact, I have found it possible to join copper and aluminum, tin and platinum, aluminum and aluminum, copper and platinum, aluminum and tin, platinum and platinum, nickel and platinum, lead and tin and tin and copper, without difficulty.

Although the entire welding process consumes only a very short period of time—approximately three thousandths of a second,—it is possible to obtain curves by means of an oscillograph, such as curves A, B and C of Fig. 21, representing, respectively, the voltage, the current and the power in the welding circuit.

From careful observation of a large number of welds and a study of the oscillograph records, I believe that the action between the engaging terminals of the wires or rods to be welded is correctly set forth in Figs. 15 to 20, inclusive, although the reliability of the representations of intermediate conditions, as indicated in Figs. 17, 18 and 19, is of no particular importance. Whether these figures are correctly representative or not, they will undoubtedly render the operation of the welding apparatus and the reason for its success more easily understood.

In Fig. 15, the terminals are shown close together as they appear when approaching each other. I have found it preferable to produce chiseled edges, as here shown, and to cross them relative to each other, so that the first engagement between the conductors is at a very small point. There is no necessity for very carefully producing these chiseled edges and, in fact, sufficiently thin edges are usually produced when wires or rods are cut off with ordinary pliers or similar shearing devices.

At the instant of contact (see Fig. 16) the voltage of the circuit falls away very rapidly, as shown by curve A. The current and the power, on the other hand, increase very rapidly, as indicated by curves B and C. In the particular case illustrated, the voltage drops from approximately 207 volts to 160 volts in .0001 of a second and reaches zero at the end of .00035 of a second. The power expended in the circuit rises from zero to 23000 watts in .0001 of a second and then almost as suddenly decreases, crossing the zero line with the voltage.

I believe that the introduction of such a tremendous amount of energy relative to the size of the conductors not only fuses the engaging surfaces but vaporizes them, producing a small explosion and actually separating the solid portions of the terminals for an instant, as shown in Fig. 17. At this stage in the operation, the terminals are surrounded by metal vapors. That this is a fact, is abundantly proved by deposits of metal particles found on the chucks of the machine after a number of welding operations have been performed. I believe that the fact that metal vapors surround the terminals before they are brought into permanent engagement is extremely important in securing successful joints between such unlike metals as aluminum and copper and between two aluminum conductors, the surfaces of which become oxidized with extreme rapidity when exposed to the air.

The small explosion above referred to, which actually blows out a certain portion of the terminals in the form of vapor, consumes so short a time that the mechanical energy produced by the dropping of the chuck, is still effective in welding the softened terminals together. The terminals are not permitted to cool after the explosion and previous to their percussive engagement because the current in the welding circuit, as indicated by curve B of Fig. 21, does not die out immediately, but continues to oscillate for several thousandths of a second.

The time during which the current continues is determined by the inductance of the welding circuit, and, as shown in Fig. 4, I prefer to employ a variable or adjustable inductance 65.

Although very nice theoretical considerations are believed to enter into the welding operation, as above indicated, it is not necessary to construct the welding apparatus or to adjust its parts with more than an ordinary degree of accuracy. Furthermore, it is not necessary to very carefully determine the capacity of the condenser, the voltage of the charging circuit or the inductance of the welding circuit. For example: I have produced successful joints between such metals as tin and platinum, platinum and nickel and copper and aluminum at the first trial without any special calculations or adjustments.

The points on the various curves which, I believe, correspond approximately to the Figs. 15 to 20, are marked $a$ to $f$, inclusive. The resistance 66 is included in the charging circuit of the condenser 41 in order to avoid short circuiting the source of supply through the welding contacts.

While the machine is relatively light, a compression between the terminals to be welded of 30,000 pounds to the square inch is obtained and, by the use of a condenser of suitable design and capacity, a sufficiently intense heat is supplied for a very small fraction of a second, to melt the engaging surfaces of and weld such metals as platinum and tin without injury to either.

The user of my process and apparatus may be afforded considerable freedom of selection in the matter of type and capacity of condenser, but, as an example of what I have found satisfactory in practice, I may state that condensers comprising aluminum trays and an electrolyte of borax and water and having capacities of approximately 1200 to 1400 microfarads have been employed in the welding of wires from #25 to #13 B. & S. gage, with excellent results.

After the joint is completed, it may be dipped in molten metal, or otherwise heated, in order to render it more ductile, if desired, but in most cases, this is found to be unnecessary.

Referring to Figs. 6, 7, 8 and 9, the machine here illustrated is similar to the machine of Figs. 1, 2 and 3 except that there are two rods 43 and 43ª which correspond to the rod 25 of the other machine, and clutches 44 and 45 are substituted for the clutches 6 and 7. The base 46, which corresponds to the base 1, is provided with a hole 47 which takes the place of the slot 11, and is countersunk to provide a tapered or cup-shaped opening 48.

The chuck 45 consists of a bolt provided with radial slots 49 which divide its tapered head 50 into segments. A small hole 51 extends longitudinally through the chuck to constitute a grip for a small wire or conducting rod. Since the slots 49 communicate with the central hole 51, the segments formed thereby, which constitute the chuck jaws, may be pressed toward each other, to grip a wire, when the chuck is fitted into the hole 47 and its head is drawn into the tapered opening 48 by a nut 52.

The chuck 44 is similar to the chuck 45 and is supported in the carriage 53 in the same way that the chuck 45 is supported in the base 46.

The jaws of the chuck may be screw-threaded, as shown in Fig. 10, in order to adapt it to receive a small screw 54, if desired. By supporting a small screw in this manner in the chuck 45 and holding a section of platinum wire in the chuck 44, the screw may be provided with a platinum tip in a very simple and easy manner. As it is well known, screws with platinum tips are in very general use for magnetos, electric bells and similar devices. Each of the chucks is provided with a pin projection 55 which engages a notch 56 for the purpose of preventing its rotation, relative to the part in which it is mounted.

The rod 43ª is provided with a catch 57 and the carriage 53 is provided with a projection 58 which correspond, respectively, to the catch 24 and the projection 26 of Fig. 3, and perform similar functions. The rod 43 is provided with adjustable stops 59 and 60 which are adapted to coöperate with a projection 61 on the carriage 53 except when the rod 43 is turned in the one or the other direction from the position in which it is held by a spring 62. The rods 43 and 43ª are respectively provided with levers 63 and 64 by which they may be rotated in opposition to their centering springs.

The operation of the machine is the same, in general, as that of Figs. 1, 2 and 3, and I, therefore, deem it necessary to refer only to the use of the parts 59, 60 and 61. When it is desired to produce a short length of conducting wire composed of a section of copper and a section of platinum, or sections of other materials for use in the manufacture of mercury vapor rectifiers or other electrical devices having glass containers, it is possible to secure just the length desired from relatively long conductors by properly setting the stops 59 and 60, and welding the adjacent ends of the two conductors together, then loosening the chuck 45, turning the rod 43 through a slight angle, lifting the carriage until its projection 61 engages stop 60, setting the chuck 45, releasing the chuck 44, and again raising the carriage until projection 61 engages stop 59, the rod 43 being first turned in the opposite direction from the center so that the projection 61 is in alinement with the last named stop. The welded wires may then be cut in close proximity to the two chucks, the distance between which is a measure of the length of wire that is desired.

Not only do I consider my process and welding apparatus broadly new, but I also believe that I secure a product which has hitherto never been produced by any means or method.

As hereinbefore suggested, my welding process may be supplemented by dipping the joint in molten solder or other metal, if found desirable, and I therefore show, in Fig. 5 of the drawings, a ladle 67 having a body of molten metal 68 therein and two wires 69 and 70 united by a welded joint that is immersed in the molten metal 68.

I desire it to be understood that my process is not limited to welding together wires or other bodies of substantially the same cross-section, as might perhaps be inferred from the foregoing disclosure. On account of the instantaneous application of intense heat to the surfaces to be welded at substantially the instant of percussive engagement between such surfaces, there is no opportunity for such dissipation of the applied heat as to destroy or impair the welding function, even though the actual welded surface of one of the bodies is only a small fraction of the surface area of which the welded surface is a part. Such conditions would obtain in welding the end of a wire or rod to the surface of a plate or block.

While the observed phenomena and the results of my welding process indicate localized generation of heat of great intensity at the instant of percussive engagement of the surfaces to be welded, it is to be understood that the utilization of electrical and mechanical energy in substantially the manner hereinbefore set forth constitutes the essence of my invention whether the weld is effected solely by heat and percussive contact or by such agencies in conjunction with other agencies that are or may be generated or liberated by the application of electrical energy at the point and instant of percussive engagement.

I claim as my invention:

1. The process of welding metal bodies that consists in effecting percussive engagement of the surfaces to be welded and simultaneously applying heat of great intensity to such surfaces.

2. The process of welding metal bodies that consists in effecting percussive engagement of the surfaces to be welded and simultaneously effecting an instantaneous application of heat of great intensity to said surfaces.

3. The process of welding metal bodies that consists in effecting a percussive engagement of the surfaces to be welded and simultaneously subjecting the said surfaces to electrical energy of great heat-producing power.

4. The process of welding metal bodies that consists in effecting a percussive engagement of the surfaces to be welded and producing a resultant welding heat at such surfaces.

5. The process of welding metal bodies that consists in effecting an electrical discharge at the surfaces to be welded and a percussive engagement between the said surfaces.

6. The process of welding metal bodies that consists in simultaneously effecting an electrical discharge and a percussive engagement between the surfaces to be welded.

7. The process of welding metal bodies that consists in effecting a percussive engagement of the surfaces to be welded and an electrostatic discharge between them at the instant of contact.

8. The process of welding metal bodies that consists in simultaneously effecting an electrostatic discharge at the surfaces to be welded and a percussive engagement of said surfaces.

9. The process of welding metal bodies that consists in effecting a percussive engagement between the surfaces to be welded, producing an electric discharge between the said surfaces at the instant of contact, and annealing the weld in molten metal.

10. The process of welding metal bodies that consists in effecting a percussive engagement between the surfaces to be welded, producing an electrostatic discharge between the said surfaces, at the instant of contact, and annealing the weld in molten solder.

11. The process of welding metal bodies which consists in effecting a percussive engagement of the surfaces to be welded and subjecting such surfaces to an electrical discharge of great energy and rapidly decreasing voltage.

12. The process of welding metal bodies which consists in effecting a percussive engagement of the surfaces to be welded and simultaneously subjecting such surfaces to an electrical discharge of great energy and rapidly decreasing voltage.

13. An electric welding apparatus, comprising means for effecting percussive engagement of the surfaces to be welded, an electrical generator having its terminals connected to the parts to be welded, and a condenser connected across the generator circuit.

14. The combination with a pair of clamping terminals for parts to be welded and means for effecting a percussive engagement of said parts, of a source of electrical energy having circuit connections to said clamping terminals and a condenser connected across the circuit of said source.

15. The combination with a pair of clamping terminals for metal bodies to be welded, and means for effecting a percussive engagement of the surfaces of said bodies, of a condenser having its terminals connected to said clamping terminals, and means for charging said condenser.

16. The combination with a pair of clamping terminals for metal bodies to be welded and means for insuring rapid movement of at least one of said terminals to effect percussive engagement of the surfaces to be welded, of means for effecting a discharge of electrical energy between the surfaces to be welded at the instant of percussive engagement thereof.

17. Electric welding apparatus comprising a pair of clamping terminals and means for insuring such movement of at least one of said terminals as to effect a percussive engagement of the surfaces to be welded.

18. Electric welding apparatus comprising a condenser, a pair of relatively movable clamping terminals for the condenser and means for insuring such movement of at least one of said terminals as to effect a percussive engagement of the surfaces to be welded.

19. In a machine for welding wires or rods, the combination with a frame having a terminal clamp at its lower end and substantially vertical guides, of a terminal-clamp carriage mounted upon said guides and adapted to fall freely by gravity to effect percussive electrical contact between the ends of conductors held in said clamps.

20. In a machine for welding wires or rods, the combination with a frame having a bottom terminal clamp, of a gravity-operated carriage having a terminal clamp, and means for restraining and releasing said carriage.

21. The combination with a source of electricity, of a machine having a pair of clamping terminals connected to said source, one of said terminals being movable by gravity to effect a percussive engagement between bodies held in said terminals and an electrical discharge from said source.

In testimony whereof, I have hereunto subscribed my name this 8th day of February, 1912.

LEWIS W. CHUBB.

Witnesses:
O. W. A. OETTING,
B. B. HINES.